United States Patent [19]

Shinjo

[11] 4,164,072

[45] Aug. 14, 1979

[54] AUTOMATIC PIERCING NUT ASSEMBLING ARRANGEMENT

[75] Inventor: Katsumi Shinjo, Osaka, Japan

[73] Assignee: Yugenkaisha Shinjo Seisakusho, Osaka, Japan

[21] Appl. No.: 859,596

[22] Filed: Dec. 12, 1977

[30] Foreign Application Priority Data

Dec. 11, 1976 [JP] Japan .......................... 51/166296[U]

[51] Int. Cl.² .................... B23P 19/04; B23Q 17/02
[52] U.S. Cl. ...................................... 29/720; 29/798; 29/809; 29/818
[58] Field of Search .............. 29/432, 509, 705, 798, 29/809, 818, 706, 707, 708, 720

[56] References Cited

U.S. PATENT DOCUMENTS

| | | | |
|---|---|---|---|
| 3,098,576 | 7/1963 | Steward | 218/2 |
| 3,961,408 | 6/1976 | Goodsmith et al. | 29/706 |
| 3,971,116 | 7/1976 | Goodsmith et al. | 29/798 |

*Primary Examiner*—Michael J. Keenan
*Attorney, Agent, or Firm*—Craig and Antonelli

[57] ABSTRACT

An automatic piercing or clinch nut assembling arrangement which includes a punch member slidably supported in a punch holder connected to a press ram for pressing a piercing or clinch nut into a metal panel with a swaging die arranged opposite the punch member and cooperating therewith for swaging metal from the metal panel inwardly of the piercing nut to anchor the same in the metal panel. A nut holding arrangement is interposed between the punch member and the swaging die for holding a piercing nut in a punching path of the punch member. A monitoring arrangement is provided for electrically ascertaining the presence or absence of a piercing or clinch nut in the punch feed path.

28 Claims, 2 Drawing Figures

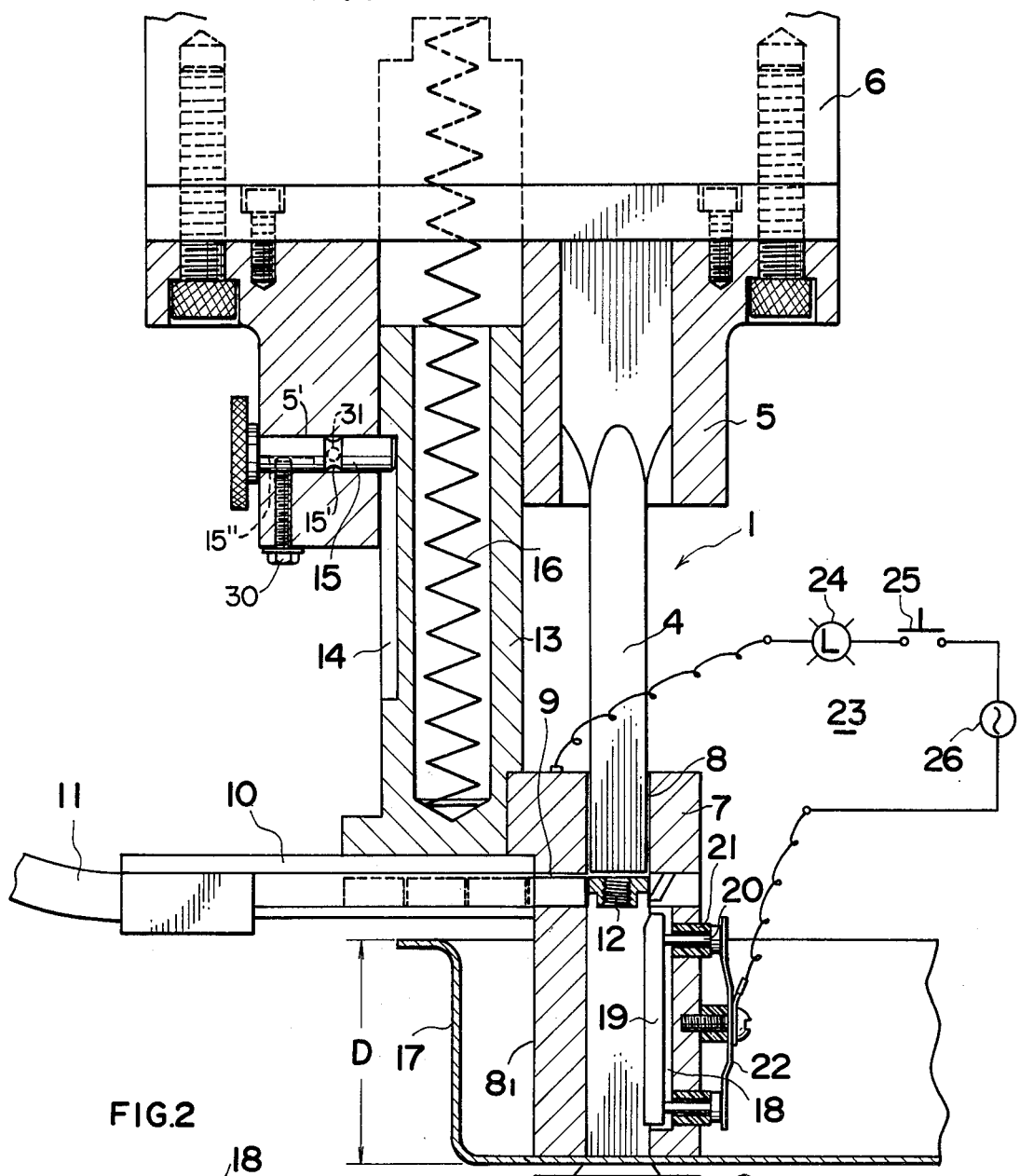

AUTOMATIC PIERCING NUT ASSEMBLING ARRANGEMENT

The present invention relates to an automatic assembling arrangement and, more particularly, to an automatic self-piercing nut assembling arrangement for effecting an assembly of self-piercing nuts and a metal panel by causing the piercing nut to punch an installation aperture in a metal panel placed on a swaging die by pressure exerted on the piercing nut by a punch and/or a ram of a press or pressing machine.

It is generally known from U.S. Pat. Nos. 2,707,322, 3,152,628, 3,187,796, 3,704,507 and commonly owned U.S. Patent Application Ser. No. 325,049, that a piercing nut or clinch nut has a square pilot portion around a central threaded opening for a screw, which pilot portion serves as a punch against a metal panel with flanges extending outwardly from the opposite sides of the pilot portion, which flanges assure the anchorage of the piercing nut in support of the metal panel thereon. Ordinarily, shallow grooves are undercut between the pilot portion and the flanges. Additionally, the pilot portion is provided with shoulders which function as piercing edges against the metal panel when used as a punch with the shoulders extending in parallel to top surfaces of the flanges. The grooves are aimed to receive a swaged metal around the nut installation aperture punched by the pilot portion of the nut, thus enabling the nut to anchor to the metal panel.

Normally, a piercing nut assembling arrangement is mounted on a ram of a press or pressing machine along with other devices such as, for example, ordinary stamping dies, and at least one other assembling arrangement of the same type. In operation, the piercing or clinch nuts are automatically supplied from a supply source or container to the assembling arrangement by way of a supply chute which extends over a relatively long distance from the supply source to the assembling arrangement. The piercing or clinch nuts are individually delivered between a punch and swaging die of the assembling arrangement in a timed relationship in accordance with an upward and downward movement of the press ram. The piercing or clinch nuts are forced into the metal panel one-by-one by virtue of the pressure exerted by the punch. The manner of anchoring the piercing nuts to sheet or plate metal panels is more fully described in U.S. Pat. Nos. 2,749,606, 3,152,628 and 3,704,507 and the afore-mentioned commonly owned U.S. Patent Application Ser. No. 325,049.

In operation of the piercing nut assembling devices, the punch is normally reciprocably mounted in a bore of a nut holding element, which bore extends perpendicular to a supplying direction of the piercing or clinch nuts with the depth of the bore depending upon the type of panel to be worked. For example, when the metal panel is a sheet or plate, the depth of the bore can be relatively short; however, when a plate portion to be worked upon is a bottom of a drawn product with erected side walls, the bore in the nut holding element must be deep enough so as to exceed the length of the side walls. In this context, the depth of the bore is construed as a length dimension from a "ready" position of the piercing or clinch nut to be pressed by the punch to a "work" position thereof.

In practical manufacturing operations, one difficulty that arises with bores which are relatively deep is the ascertainment of the presence of a piercing or clinch nut remaining in the punch feeding path. The possibility of a piercing or clinch but remaining undetected in a punch feeding path is increased due to the complicated profiles of the piercing or clinch nut. As can be appreciated, without a detection of the presence of the nut remaining in the bore, various problems and/or damage to the punch assembly may well occur if the next punching procedure is started without removing the nut from the punch feeding path.

The aim underlying the present invention essentially resides in providing an automatic piercing nut assembling arrangement which includes a monitoring means for ascertaining or determining the absence and/or presence of a clinch or piercing nut in a punch feeding path.

According to one advantageous feature of the present invention, a monitoring means is arranged in a bore of a nut holding element, which monitoring means is capable of electrically detecting the presence of a nut in a punch feeding path.

According to a further advantageous feature of the present invention, a button switch means is provided which is adapted to be actuated or pressed for the purpose of determining whether or not a nut is present in the punch feeding path so as to determine whether or not it is possible to continue carrying out the normal operation of the punching assembly.

In accordance with the present invention, the electrical monitor is normally in a de-energized condition unless the button switch means is actuated to determine the presence or absence of a piercing or clinch nut in the punch feeding path.

Accordingly, it is an object of the present invention to provide a piercing or clinch nut assembling arrangement which avoids by simple means the shortcomings and drawbacks encountered in the prior art.

Another object of the present invention resides in providing a piercing or clinch nut assembling arrangement by which an assembly of the piercing or clinch nuts can be effected in a completely automatic manner.

A further object of the present invention resides in providing a piercing or clinch nut assembling arrangement wherein a punch feeding path is capable of being continually monitored to determine the presence or absence or piercing or clinch nuts therein.

An additional object of the present invention resides in providing a piercing or clinch nut assembling arrangement which functions reliably under all operating conditions.

Yet another object of the present invention resides in providing a piercing or clinch nut assembling arrangement which is simple in construction and, therefore, inexpensive to manufacture.

These and other objects, features and advantages of the present invention will become more apparent from the following description when taken in connection with the accompanying drawings which show, for the purposes of illustration only, one embodiment in accordance with the present invention, and wherein:

FIG. 1 is a vertical cross-sectional view through an automatic piercing nut assembling arrangement in accordance with the present invention; and FIG. 2 is a cross-sectional view, on an enlarged scale, of a detail of the automatic piercing nut assembling arrangement of FIG. 1 showing the disposition of a piercing nut in a bore of an extended portion of a nut holding element.

Referring now to the drawings wherein like reference numerals are used in both views to designate like parts and, more particularly, to FIG. 1, according to this figure, a piercing nut assembling arrangement generally designated by the reference numeral 1 is mounted on a press or pressing machine together with other stamping dies (not shown) with the punch section of the assembling arrangement being fixed to a press ram 6 and a swaging die 2 being fixed to a base plate 3 of the press in a manner disclosed more fully in commonly assigned U.S. Patent Application Ser. No. 859,593, entitled "Automatic Piercing Nut Assembling Arrangement", the disclosure of which is incorporated herein by reference to the extent necessary in understanding the present invention.

A punch 4 is mounted on the ram 6 by a punch holder 5 with the punch 4 being moved up and down in a bore 8 provided in a holding block 7. The holding block 7 is provided with a nut supply passage 9 which intersects the bore 8 at a right angle. The nut supply passage 9 feeds self-piercing or clinch nuts 12 one-by-one into the holding block 7 by way of a resilient supply chute or hose 11 supported by a connector member 10. The individual piercing or clinch nuts 12 are delivered to a space produced at the intersection of the bore 8 and the supply passage 9. The manner of advancing or delivering the piercing nuts or clinch nuts 12 to the supply chute or hose 11 is disclosed more fully in U.S. Patent Application Ser. No. 859,592, entitled "Component Conveying Arrangement", the disclosure of which is incorporated herein by reference to the extent necessary in understanding the present invention.

The holding block 7 is fixed to a guide post 13 which is maintained in slidable contact with the punch holder 5 so as to effect a unitary movement of the guide post 13 and the holding block 7 with respect to the punch holder 5. The guide post 13 is provided with a groove or recess 14 at a side thereof opposite a side facing the punch holder 5. The groove or recess 14 receives or accommodates a locking pin 15 and serves to limit the vertical movement of the guide post 13 over the range of the axial length of the recess or groove 14. The guide post 13 houses or accommodates a coil spring 16 which normally urges or bias the guide post in a downward direction with respect to the punch holder 5.

The locking pin 15 is slidably held in a bore 5' provided in the holder 5 with a ring-shaped groove 15' being provided around a central shank portion of the locking pin 15. The ring-shaped groove 15' is adapted to receive balls 31 with the groove and balls functioning as a detent and defining or determining a degree of insertion of the locking pin 15 into the groove 14 in a manner described more fully in the aforementioned U.S. Patent Application Ser. No. 859,593.

In a normal operation of the assembling arrangement, the locking pin 15 is inserted and locked by a bolt 30 in the recess or groove 14, thereby setting the assembling arrangement for a normal operation. In this position, the piercing or clinch nuts 12 are delivered from the nut supply passage 9 to a position beneath the punch 4.

The locking pin 15 is provided with a recess 15" on an undersurface thereof with the recess being elongated and having an axial length such that the locking pin 15 can be withdrawn completely from the groove 14, thereby enabling the interconnected holding block 7, supply chute or hose 11 and connector member 10 to be removed as a whole unit from the punch holder 5 in a downward direction as viewed in FIG. 1.

When a member 17 to which the piercing or clinch nuts 12 are to be anchored is a drawn member with erected side walls such as, for example, a box or receptacle, and when the piercing or clinch nuts 12 are to be anchored in a bottom wall thereof, it is necessary to provide the nut holding block 7 with an extension portion having a length sufficient to reach the bottom wall of the member 17. In the illustrated embodiment, the nut holding block 7 has an extended or leg portion $8_1$. The leg portion $8_1$ extends into the bore 8 so as to have sufficient depth to provide a feed path for the punch 4. The length of the leg or extended portion $8_1$ depends upon the depth D of the side walls of the drawn member 17.

The nut holding block 7 is provided with a recess 18 along an inside wall thereof with the recess extending along the length of the extended or leg portion $8_1$. A nut detector 19 constructed as an electrical conductor is disposed in the recess 18. The nut detector 19 is provided with a pair of pins 20 slidably inserted in electrical insulator sleeves 21. The insulating sleeves 21 are held in the side wall of the nut holding block 7 with the pins 20 being backed up by a leaf spring 22 so as to normally bias or urge the nut detector 19 in such a manner so as to be projecting into the bore of the extended or leg portion $8_1$. The nut detector 19 is electrically connected to a circuit 23 having terminals which are electrically connected to the nut holding block 7 and the nut detector 19 with the circuit including, for example, a pilot lamp 24, a push button switch 25 and a power source 26.

In operation, as the ram 6 is lowered, the punch section as a whole is lowered until the holding block 7 comes into contact with the drawn member 17 placed on a swaging die 2. When the holding block 7 comes into complete contact with the drawn member 17, only the punch 4 is further lowered in the course of which the pilot portion of the piercing or clinch nut 12, held in the bore 8 of the holding block 7, is forced into the drawn member 17 so as to pierce an aperture therein. The drawn member 17 is further lowered by continued movement of the ram 6 and punch 4 until it is in engagement with the top surfaces of the flanges of the piercing or clinch nuts 12. When drawn member 17 is completely received by the flanges of the piercing or clinch nut 12, the swaging edges of the swaging die 2 swage the metal of the drawn member 17 around the aperture already punched by the pilot portion of the piercing or clinch nut 12, thereby enabling the nut 12 to anchor in the bottom wall of the drawn member 17 in a known manner.

As illustrated in FIG. 2, if a piercing or clinch nut 12 remains in the bore 8 of the extended or leg portion $8_1$ of the holding block 7, a circuit is completed between the nut holding block 7 and the nut detector 19 through the remaining piercing or clinch nuts 12 when the push button switch 25 is actuated. The completion of the circuit will result in the illumination of the pilot lamp 24, thereby providing a signal of the presence of the nut 12 in the feed path of the punch 4. In normal operation, the piercing or clinch nut 12 is passed through the bore 8 by the punch 4 while maintaining contact with the nut detector 19; however, the circuit 23 will remain open until the push button switch 25 is pressed so that, in normal operation, there is no illumination of the pilot lamp 24.

While the illustrated embodiment employs a pilot lamp 24, it is understood that other signalling devices such as, for example, a bell, a buzzer, a horn or the like may be provided.

While I have shown and described only one embodiment in accordance with the present invention, it is understood that the same is not limited thereto, but is susceptible of numerous changes and modifications as known to a person skilled in the art, and I therefor do not wish to be restricted to the details shown and described herein, but intend to cover all such changes and modifications as are encompassed by the scope of the appended claims.

I claim:

1. An automatic piercing nut assembling arrangement, comprising:
    a punch means slidably supported in a punch holder connected to a press ram for pressing a piercing nut into a metal panel;
    a swaging die means arranged opposite said punch means and cooperating therewith for swaging metal from the metal panel inwardly of the piercing nut to anchor the same in the metal panel;
    means interposed between said punch means and said swaging die means for holding a piercing nut in a punching path of said punch means including a holding block having an extended leg portion and a bore means extending therethrough for receiving a piercing nut, said bore means having a sufficient diameter so as to permit said punch means to pass therethrough during a downward movement of the press ram, said extended leg portion having a predetermined axial length so as to permit the piercing nut to be anchored at a bottom wall of a deep drawn metal panel;
    means for supplying piercing nuts to said holding means;
    means operatively connected with said holding means for causing a monitoring of a presence of a piercing nut therein and for providing a signal of the presence of a piercing nut in a punching path of the punch means including a nut detector means arranged in the bore means of said holding block, lamp means for providing a visible signal of a presence of a piercing nut in the bore means, circuit means for interconnecting said holding means to said detector means and said lamp means, and means for selectively actuating said circuit means so as to determine if a piercing nut is present in the bore means;
    said nut detector means includes an electrical conductor arranged in said circuit means, and said bore means includes an axially extending recess means provided in at least a portion of said extended leg portion for accommodating said electrical conductor;
    means for normally biasing said electrical conductor into said bore means;
    at least two freely supported electrically insulated pin means for mounting said electrical conductor at said recess means of said extended leg portion; and
    wherein said biasing means includes a leaf spring means engaging each of said insulated pin means.

2. An arrangement according to claim 1, wherein said means for selectively actuating said circuit means includes a push button switch.

3. An arrangement according to claim 2, wherein said piercing nut supplying means includes a nut supply passage means provided in said holding block for receiving a continuous supply of piercing nuts, and a nut supply chute means for supplying nuts to said supply passage means from a nut storage means.

4. An arrangement according to claim 3, wherein a post means is slidably supported at the punch holder for guiding a movement of said holding block relative to said punch means, and wherein means are provided for engaging said holding block with said post means.

5. An arrangement according to claim 4, wherein said engaging means includes a locking pin retractably inserted in a bore of the punch holder, and an axially extending recess means provided in said post means for accommodating said locking pin and enabling said locking pin to move reciprocably in said recess means when the punch ram is moved up and down.

6. An arrangement according to claim 5, wherein a locking means is provided for locking said locking pin in said recess means.

7. An arrangement according to claim 6, wherein said locking means includes a bolt means arranged in the punch holder for engaging an undersurface of the locking pin.

8. An arrangement according to claim 7, wherein said locking means includes a recess provided in the undersurface of the locking pin for accommodating an end of said bolt means.

9. An arrangement according to claim 8, wherein said recess in the undersurface of said locking pin has an axial length which permits said locking pin to be completely withdrawn from said recess means in the post means.

10. An arrangement according to claim 9, wherein a connector means is provided for connecting the nut supply chute means to said holding block.

11. An arrangement according to claim 10, wherein means are provided for normally biasing said post means in a downward direction with respect to the punch holder.

12. An arrangement according to claim 11, wherein means are provided for determining a degree of insertion of said locking pin.

13. An arrangement according to claim 12, wherein said last-mentioned means includes a ring-shaped groove provided around a central shank portion of said locking pin, and biased detent means cooperable with said ring-shaped groove.

14. An arrangement according to claim 13, wherein said detent means includes at least one ball element arranged in a bore of the punch holder and spring means for normally biasing said at least one ball element toward said locking pin.

15. An automatic piercing nut assembling arrangement, comprising:
    a punch means slidably supported in a punch holder connected to a press ram for pressing a piercing nut into a metal panel;
    a swaging die means arranged opposite said punch means and cooperating therewith for swaging metal from the metal panel inwardly of the piercing nut to anchor the same in the metal panel;
    means interposed between said punch means and said swaging die means for holding a piercing nut in a punching path of said punch means including a holding block having an extended leg portion and a bore means extending therethrough for receiving a piercing nut, said bore means having a sufficient diameter so as to permit said punch means to pass therethrough during a downward movement of the press ram, said extended leg portion having a predetermined axial length so as to permit the piercing nut to be anchored at a bottom wall of a deep drawn metal panel;

means for supplying piercing nuts to said holding means;

means operatively connected with said holding means for causing a monitoring of a presence of a piercing nut therein and for providing a signal of the presence of a piercing nut in a punching path of the punch means;

a post means slidably supported at the punch holder for guiding a movement of said holding block relative to said punch means; and means for engaging said holding block with said post means.

16. An arrangement according to claim 15, wherein said engaging means includes a locking pin retractably inserted in a bore of the punch holder, and an axially extending recess means provided in said post means for accommodating said locking pin and enabling said locking pin to move reciprocably in said recess means when the punch ram is moved up and down.

17. An arrangement according to claim 16, wherein a locking means is provided for locking said locking pin in said recess means.

18. An arrangement according to claim 17, wherein said locking means includes a bolt means arranged in the punch holder for engaging an undersurface of the locking pin.

19. An arrangement according to claim 18, wherein said locking means includes a recess provided in the undersurface of the locking pin for accommodating an end of said bolt means.

20. An arrangement according to claim 19, wherein said recess in the undersurface of said locking pin has an axial length which permits said locking pin to be completely withdrawn from said recess means in the post means.

21. An arrangement according to claim 20, wherein a connector means is provided for connecting the nut supply chute means to said holding block.

22. An arrangement according to claim 21, wherein means are provided for normally biasing said post means in a downward direction with respect to the punch holder.

23. An arrangement according to claim 22, wherein means are provided for determining a degree of insertion of said locking pin.

24. An arrangement according to claim 23, wherein said last-mentioned means includes a ring-shaped groove provided around a central shank portion of said locking pin, and biased detent means cooperable with said ring-shaped groove.

25. An arrangement according to claim 23, wherein said detent means includes at least one ball element arranged in a bore of the punch holder and spring means for normally biasing said at least one ball element toward said locking pin.

26. An arrangement according to claim 15, wherein said monitoring and signal means includes a nut detector means arranged in the bore means of said holding block, lamp means for providing a visible signal of a presence of a piercing nut in the bore means, circuit means for interconnecting said holding means to said detector means and said lamp means, and means for selectively actuating said circuit means so as to determine if a piercing nut is present in the bore means.

27. An arrangement according to claim 26, wherein said nut detector means includes an electrical conductor arranged in said circuit means, and wherein said bore means includes an axially extending recess means provided in at least a portion of said extended leg portion for accommodating said electrical conductor.

28. An arrangement according to claim 27, wherein means are provided for normally biasing said electrical conductor into said bore means.

* * * * *